US008457688B2

(12) United States Patent
Stenmark et al.

(10) Patent No.: US 8,457,688 B2
(45) Date of Patent: Jun. 4, 2013

(54) MOBILE WIRELESS COMMUNICATIONS DEVICE WITH VOICE ALTERATION AND RELATED METHODS

(75) Inventors: Fredrik Stenmark, Kitchener (CA); Daniel Hanson, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 510 days.

(21) Appl. No.: 12/393,187

(22) Filed: Feb. 26, 2009

(65) Prior Publication Data

US 2010/0216511 A1 Aug. 26, 2010

(51) Int. Cl.
*H04H 40/00* (2008.01)
*H04B 1/38* (2006.01)
*H04R 9/06* (2006.01)
*H04R 1/02* (2006.01)
*H04R 25/00* (2006.01)
*H03G 3/00* (2006.01)
*G10L 11/00* (2006.01)

(52) U.S. Cl.
USPC ............ 455/563; 455/3.06; 381/61; 381/322; 381/312; 704/270; 704/272; 704/278; 704/271

(58) Field of Classification Search
USPC ................. 455/3.06, 563, 90.1, 205, 39, 508, 455/91; 704/270, 272, 278, 271; 381/61, 381/322, 312
See application file for complete search history.

(56) References Cited

U.S. PATENT DOCUMENTS

| | | | | |
|---|---|---|---|---|
| 5,765,134 | A * | 6/1998 | Kehoe ........................... | 704/270 |
| 5,819,866 | A | 10/1998 | Smith et al. .................... | 180/197 |
| 6,404,872 | B1 | 6/2002 | Goldberg et al. ........ | 379/201.11 |
| 6,813,490 | B1 * | 11/2004 | Lang et al. ................. | 455/414.1 |
| 6,987,514 | B1 * | 1/2006 | Beresin et al. ................ | 345/473 |
| 2003/0014246 | A1 * | 1/2003 | Choi ............................. | 704/207 |
| 2006/0019706 | A1 | 1/2006 | Ho et al. ...................... | 455/556.2 |
| 2006/0189357 | A1 * | 8/2006 | Hsueh ............................ | 455/567 |
| 2008/0254753 | A1 * | 10/2008 | Steenstra et al. ............. | 455/90.1 |
| 2008/0275700 | A1 | 11/2008 | Bingley et al. ................ | 704/235 |
| 2009/0307105 | A1 * | 12/2009 | Lemay et al. .................. | 705/26 |

FOREIGN PATENT DOCUMENTS

| | | |
|---|---|---|
| EP | 1560405 A | 8/2005 |
| FR | 2830718 A | 4/2003 |
| WO | WO02/39424 | 5/2002 |
| WO | WO2004/021686 | 3/2004 |
| WO | WO2007/018882 | 2/2007 |

OTHER PUBLICATIONS

Anonymous, "Mobile Phone Voice Changer," www.BrickHouseSecurity.com, 2009, pp. 1.
Tunney, J.R., "Asterisk Voice Changer," Lobstertech, Inc., Oct. 25, 2005, pp. 3.

(Continued)

*Primary Examiner* — Jinsong Hu
*Assistant Examiner* — Opiribo Georgewill
(74) *Attorney, Agent, or Firm* — Allen, Dyer, Doppelt, Milbrath & Gilchrist, P.A.

(57) ABSTRACT

A mobile wireless communications device may include a housing, a wireless transceiver carried by the housing, an audio transducer carried by the housing, and a novelty voice alteration processor carried by the housing and coupled to the wireless transceiver and the audio transducer and configured to alter voice communications. For example, the novelty voice alteration processor may comprise a memory and a processor cooperating therewith to alter the voice communications.

12 Claims, 3 Drawing Sheets

OTHER PUBLICATIONS

Anonymous, "Nokia Cellular Voice Changer," www.pdiltd.com, 2009, pp. 1.

Anonymous, "Portable Voice Changer," www.pdiltd.com, 2009, pp. 1.

Anonymous, "Portable Professional Voice Changer," www.BrickHouseSecurity.com, 2009, pp. 1.

Anonymous, "Pro Voice Changer," www.SpyLife.com, 2009, pp. 2.

Anonymous, "Voice Changer Operating Instructions," www.electronickits.com, Undated, pp. 4.

Anonymous, "AV Voice Changer Software Diamond 6.0," www.audio4fun.com, 2009, pp. 2.

\* cited by examiner

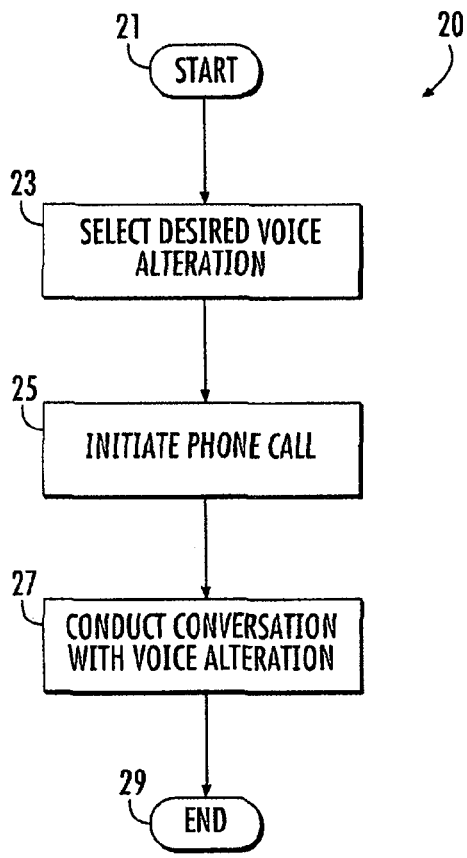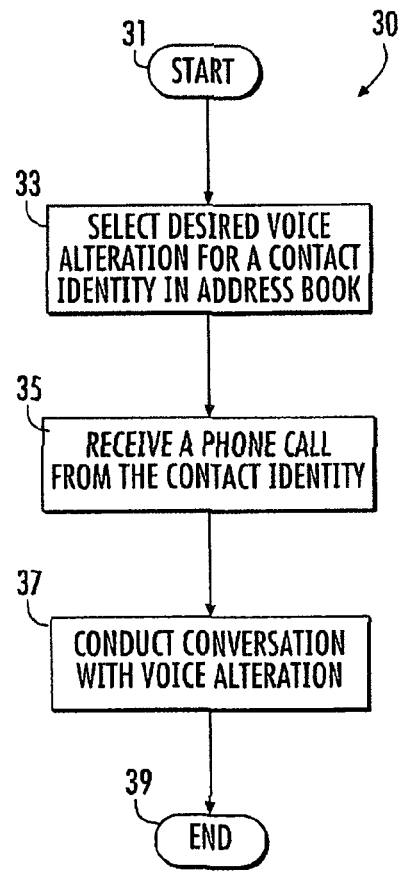
FIG. 3
FIG. 4

MOBILE WIRELESS COMMUNICATIONS DEVICE WITH VOICE ALTERATION AND RELATED METHODS

TECHNICAL FIELD

The present disclosure relates to the field of wireless communications, and, more particularly, to mobile wireless communications devices with voice alteration and related methods.

BACKGROUND

Mobile communications devices have become an integral part of society over the last two decades. Indeed, more than eighty-two percent of Americans own a mobile communications device, for example, a cell phone device. Even further, international cell phone device penetration has reached 3.3 billion units. In other words, approximately half the world's population has a cell phone device. The typical cell phone device includes an antenna, and a transceiver coupled to the antenna. The transceiver and the antenna cooperate to transmit and receive communications signals with a network infrastructure, usually maintained by a cell phone provider.

Although the first cell phone devices typically included only voice or limited short message service capabilities, the capabilities of cell phone devices have increased greatly over the last decade. More so, the typical "smart phone," i.e. a cell phone device with advanced capabilities, rivals the processing power and memory of desktop personal computers of a decade earlier. For example, the typical smart phone is capable of running a variety of advanced programs spanning from typical word processing software to global positioning system navigation software.

As the capabilities of cell phone devices have increased, cell phone providers have gained access to new potential revenues streams. For example, cell phone providers sell multimedia content to their subscribers. More specifically, the cell phone providers typically sell ring tones and digital music files via the cell phone. The cell phone providers charge small fees for each transaction, which is separate from the typical monthly subscription fee.

Another recently developed potential revenue stream is the sale of third party applications for the cell phone devices. In other words, the cell phone providers provide a venue for third parties to sell their software to subscribers. Of course, the cell phone providers typically derive a fee from the third parties for providing the venue. A particularly advantageous venue for these third party applications is the so-called mobile application store platform. For example, the Application Center of Research In Motion Limited, the assignee of the present application, provides an on-device platform for third party applications. Because of the easy access to a plurality of third party applications and the capability of paying for such applications wirelessly via the cell phone subscriber's account, the mobile application store platform provides a robust consumer solution with great potential for large revenue.

Voice alteration telephony technology has been available for landlines for some time. Typical approaches include, for example, acoustic couplers, complex personal computer based software using external microphones, and other hardware based approaches. Voice alteration is also available for cell phone devices for identity concealment, but typically requires some form of external attachment or accessory. The known approaches may suffer from several drawbacks, for example, bulkiness and limited availability.

BRIEF DESCRIPTION OF THE DRAWINGS

FIG. 3 is a flowchart illustrating operation of the mobile wireless communications device of FIG. 1.

FIG. 4 is another flowchart illustrating operation of the mobile wireless communications device of FIG. 1.

DETAILED DESCRIPTION OF THE EMBODIMENTS

Figure 1:
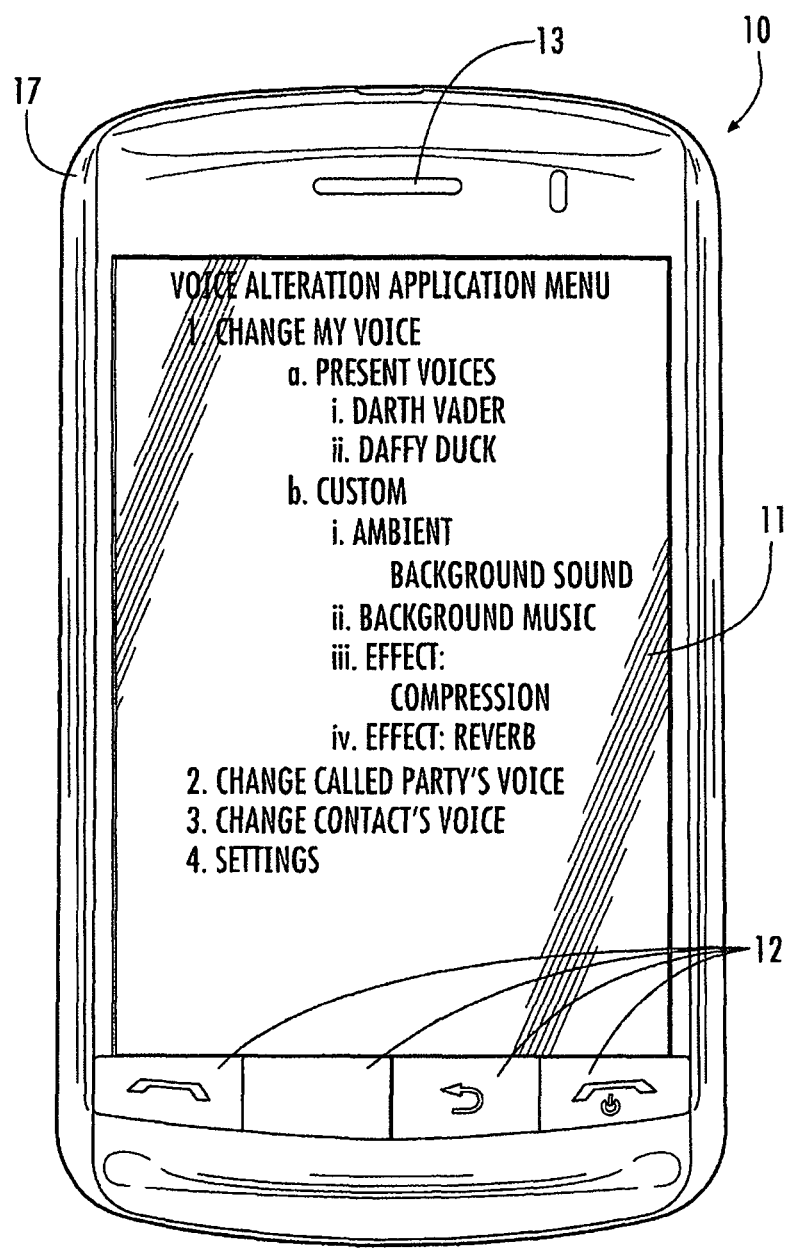
FIG. 1 is a schematic diagram of a mobile wireless communications device according to the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

A mobile wireless communications device may include a housing, a wireless transceiver carried by the housing, at least one audio transducer carried by the housing, and a novelty voice alteration processor carried by the housing and coupled to the wireless transceiver and the audio transducer and configured to alter voice communications. Advantageously, the voice alteration is performed without use of an external accessory or an adapter. In addition, the voice alteration may provide entertainment value for a user of the mobile wireless communications device.

More specifically, the novelty voice alteration processor may comprise a memory and a processor cooperating therewith to alter the voice communications. In some embodiments, the novelty voice alteration processor may download novelty voice alteration code to the memory via the wireless transceiver.

Furthermore, the novelty voice alteration processor may be configured to alter voice communications input to the audio transducer and transmitted via the wireless transceiver. Also, the novelty voice alteration processor may also be configured to alter voice communications output by the audio transducer and received via the wireless transceiver.

The novelty voice altering processor may be further configured to selectively alter the voice communications. For example, the novelty voice altering processor may be further configured to selectively alter the voice communications based upon an identity of a user. Also, the novelty voice altering processor may be further configured to selectively alter the voice communications based upon an identity of a user by shifting at least part of the voice communications from a first frequency range to a second frequency range.

In other embodiments, the novelty voice altering processor may be further configured to add false background sounds to the altered voice communications. For example, the false background sounds may comprise at least one of crowd noise, static noise, fading channel noise, or street noise.

Additionally, the novelty voice altering processor may be further configured to add music to the altered voice communications. More particularly, the novelty voice alteration processor may be configured to alter at least one of a pitch value, a time constant value, a reverberation value, an overtone value, a compression value, or an equalization value.

Another aspect is directed to a method of operating a mobile wireless communications device comprising a housing, a wireless transceiver carried by the housing, at least one audio transducer carried by the housing, and a novelty voice alteration processor carried by the housing and coupled to the wireless transceiver and the at least one audio transducer. The method may include configuring the novelty voice alteration processor to alter voice communications.

Figure 2:
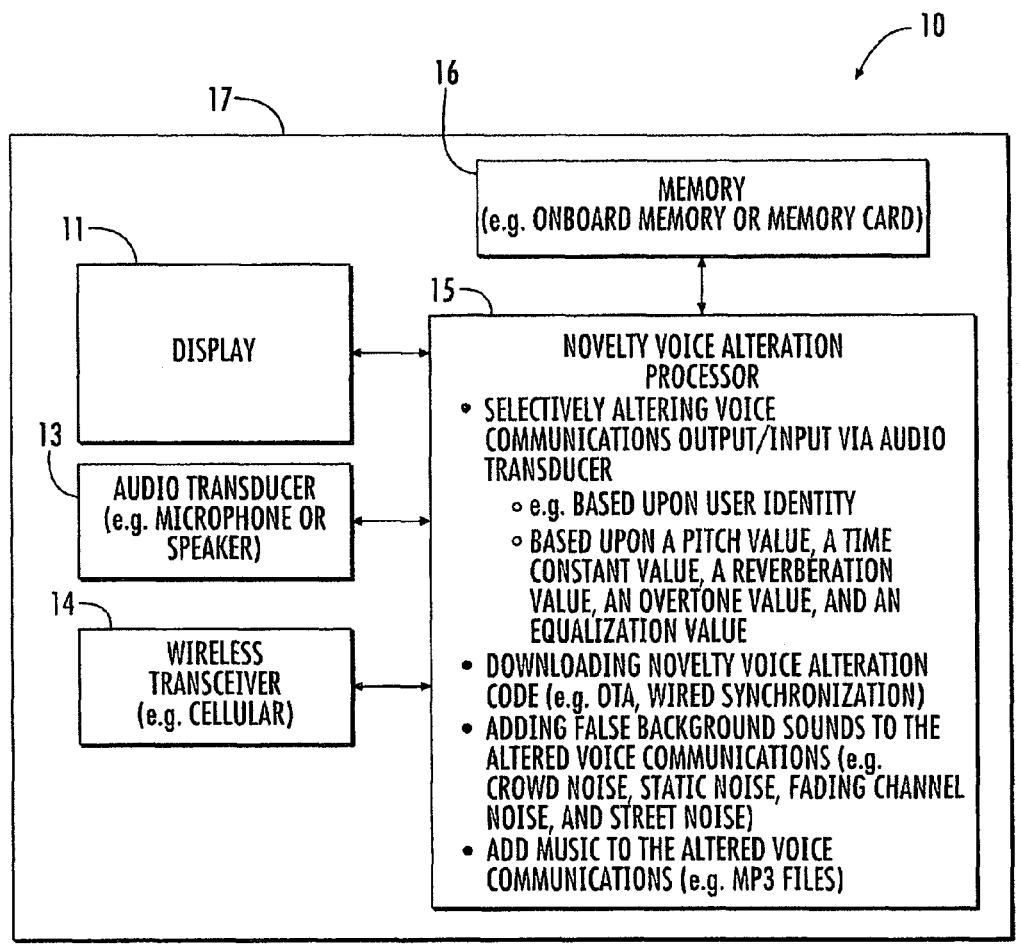
FIG. 2 is a more detailed schematic diagram of the mobile wireless communications device of FIG. 1.

Referring initially to FIGS. 1-2, a mobile wireless communications device 10 is now described. The mobile wireless communications device 10 illustratively includes a housing 17, a wireless transceiver 14 carried by the housing, an audio transducer 13 carried by the housing, and a novelty voice alteration processor 15 carried by the housing and coupled to the wireless transceiver and the audio transducer. The mobile wireless communications device 10 also illustratively includes mechanical buttons 12 for operation of the device.

As will be appreciated by those skilled in the art, the audio transducer 13 may include one or more of a microphone and a speaker, for example, and the wireless transceiver 14 may comprise one or more of a global positioning system transceiver and a cellular transceiver, i.e. at least one of a Global System for Mobile communications (GSM) transceiver or a code division multiple access (CDMA) transceiver. For example and as will be appreciated by those skilled in the art, the wireless transceiver 14 may comprise one or more of 3G Wideband Code Division Multiple Access (W-CDMA)/Universal Mobile Telecommunications System (UMTS) or 4G Long Term Evolution (LTE) wireless transceivers.

The mobile wireless communications device 10 illustratively includes a memory 16, for example, an on-board/on-chip memory or a removable memory card or both. As will be appreciated by those skilled in the art, the memory 16 may store program code, for example, voice alteration program code. The mobile wireless communications device 10 also illustratively includes a display 11 coupled to and cooperating with the novelty voice alteration processor 15. The display 11 may comprise, for example, a transmissive thin film transistor liquid crystal display.

As will be appreciated by those skilled in the art, the novelty voice alteration processor 15 is configured to alter voice communications. Specifically, the novelty voice alteration processor 15 cooperates with the memory 16 to execute the voice alteration program code stored therein. Advantageously, the novelty voice alteration processor 15 may download the novelty voice alteration program code to the memory 16 via the wireless transceiver 14, for example, the user may access a mobile application store platform, for example, the Application Center of Research In Motion Limited, the assignee of the present application.

Advantageously, the mobile wireless communications device 10 may manipulate and alter the voice communications internally using the on-board processing and memory resources. The novelty voice alteration processor 15 advantageously may operate without the need of external resources, such as network resource assistance. For example, U.S. Pat. No. 6,404,872 to Goldberg et al. discloses a system for voice alteration where the voice alteration is performed within the network infrastructure.

The novelty voice alteration processor 15 advantageously may operate without the need of bulky external attachments of typical prior art approaches. For example, the Mobile Phone Voice Changer, as available from BrickHouse Electronics L.L.C., includes a voice alteration external attachment for coupling to a mobile telephone device.

Although the novelty voice alteration processor 15 may be applied by a user for purposes of amusement, the mobile wireless communications device 10 having the novelty voice alteration processor advantageously may provide many practical benefits as well. For example, with individuals having hearing loss in certain audible frequencies, a voice altered with the novelty voice alteration processor 15 can be shifted to frequencies in which the hearing loss of the listener is less pronounced, thereby enabling the listener to more readily hear what is said.

In other words, the internal, on-board, on-chip processor of the mobile wireless communications device 10 supports the operations of the novelty voice alteration processor 15. Indeed, this integrated and internal approach maintains the mobile nature of the device. Of course, this integrated and internal approach does not preclude the use of typical audio accessories, such as, Bluetooth wireless audio handset/speaker phone systems and typical wired handsets, for example.

The novelty voice alteration processor 15 changes the sound of voice communications transmitted or received or both by the mobile wireless communications device 10. As will appreciated by those skilled in the art, during a typical cell phone device conversation between a local user and a distant user, the novelty voice alteration processor 15 alters one or both of the local user's voice and the distant user's voice.

More specifically, the novelty voice alteration processor 15 is configured to alter voice communications input via the audio transducer (microphone) 13 and transmitted via the wireless transceiver 14, i.e. outgoing voice communications. Also, the novelty voice alteration processor 15 is also configured to alter voice communications output by the audio transducer 13 and received via the wireless transceiver 14, i.e. incoming voice communications.

Advantageously, the voice alteration may be kept local, i.e. one-sided voice alteration, and not transmitted to the distant user, i.e. the phone conversation sounds routine and typical to the distant user, thereby enhancing the novelty purposes of the novelty voice alteration processor 15. Alternatively, the voice alteration may be two-sided, i.e. the mobile wireless communications device 10 would transmit the altered voice communications to the distant user.

The novelty voice alteration processor 15 is configured to alter at least one of a pitch value, a time constant value, a reverberation value, an overtone value, a compression value, or an equalization value of the voice communications. The aforementioned values may form a voice alteration set to provide a desired voice alteration. In advantageous embodiments, the mobile wireless communications device 10 may have a plurality of desired voice alteration sets stored in the memory 16 or readily available for user download from the mobile application store platform. The desired voice alteration sets may provide voice alteration to mimic famous celebrities and fictional characters, for example, the illustrated Darth Vader and Daffy Duck.

As will be appreciated by those skilled in the art, the novelty voice alteration processor 15 may alter the voice communications based upon several methods, for example, by sampling voice data with a buffer and using fast Fourier transforms (FFT) to convert it into the frequency domain. The voice data is then modulated in the frequency domain. Inverse FFTs are performed to return the altered voice data into the time domain. One possible technique for modulating the voice data in the frequency domain involves shifting one or more frequency components of the voice to higher or lower frequencies. Applying such techniques, it is possible to alter a voice so that the voice may be better heard by an individual having hearing loss in certain audible frequencies.

Moreover, the local user of the mobile wireless communications device 10 may create custom voice alteration sets by individually setting each voice alteration value. In particularly advantageous embodiments, the local user may utilize the illustrated menu to manipulate these features.

As will be appreciated by those skilled in the art, if the local user selects a longer time constant value for a desired voice alteration set, i.e. which alters the voice data to extend further across the time domain. The memory 16 may serve as a buffer to store input unaltered voice communications until the alteration lag is extinguished.

Referring additionally and briefly to FIG. 3 and flowchart 20, the process of setting a desired voice alteration for a phone conversation begins at Block 21. The local user selects a desired voice alteration set at Block 23 and initiates, in typical fashion, the phone call at Block 25. At Block 27, the local user conducts the phone conversation with voice alteration and ends the voice communications when desired. (Block 29).

Referring additionally and briefly to FIG. 4 and flowchart 30, in some embodiments, the novelty voice altering processor 15 may be further configured to selectively alter the voice communications. As will be appreciated by those skilled in the art, the mobile wireless communications device 10 stores a list of contacts within the memory 16. For example, the novelty voice altering processor 15 may be further configured to selectively alter the voice communications based upon an identity of a user (either a local user or a distant user or both). In the illustrated embodiment, the novelty voice altering processor 15 selectively alters the voice communications of the local user to shift one or more frequencies of the voice communication from the frequency ranges that are problematic to the distant user, who will be hearing the voice communication of the local user. By moving some or all of voice communication frequencies from the problematic range to easier-to-hear ranges, the local user's voice can be more easily heard by the distant user. Information about what ranges are better or worse for particular users (which can be obtained from sources such as conventional audiograms or simple trial-and-error) can be programmed into mobile wireless communications device 10 and stored within memory 16 as part of the contact information. Beginning at Block 31, the local user may select a desired voice alteration set for a contact at Block 33. When communication with a particular contact begins at Block 35, the novelty voice alteration processor 15 automatically loads a desired voice alteration set for that voice communication and alters the voice communications during the phone conversation. (Block 37). The process ends at Block 39.

In other embodiments, the novelty voice altering processor 15 may be further configured to add false background sounds to the altered voice communications. For example, the false background sounds may comprise at least one of crowd noise, static noise, fading channel noise, or street noise. Advantageously, the novelty voice altering processor 15 may provide the distant user with the false illusion that the local user in situated in the corresponding crowded street or restaurant. Alternatively, the fading channel noise provides the distant user with the false illusion that the local user is entering an area with less than desirable network coverage, thereby providing the local user with pretence to end the cell phone conversation. Indeed, the novelty voice altering processor 15 may be set to enable the false background noise after a set period of time has passed when a particular contact calls.

In yet other embodiments, the novelty voice altering processor 15 may be further configured to add music to the altered voice communications. More specifically, the mobile wireless communications device 10 may store audio media files, for example, mp3 and wav files, within the memory 16. In addition to the voice alteration features discussed above, the novelty voice altering processor 15 may add playback from these audio media files into the voice communications. As will be appreciated by those skilled in the art, the selective voice alteration features discussed above, for example, contact based selective voice alteration or time delayed voice alteration, may be applied similarly to the above false background sounds and music features.

Another aspect is directed to a method of operating a mobile wireless communications device 10 comprising a housing 17, a wireless transceiver 14 carried by the housing, at least one audio transducer 13 carried by the housing, and a novelty voice alteration processor 15 carried by the housing and coupled to the wireless transceiver and the at least one audio transducer. The method may include configuring the novelty voice alteration processor 15 to alter voice communications.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A mobile wireless communications device comprising:
   a housing;
   a wireless transceiver carried by said housing;
   at least one audio transducer carried by said housing;
   a memory carried by said housing; and
   a voice alteration processor carried by said housing and coupled to said wireless transceiver, said at least one audio transducer, and said memory, said voice alteration processor configured to
   download voice alteration code and at least one set of voice communications parameters from a mobile application store platform, each set of voice communications parameters comprising a pitch value, a time constant value, a reverberation value, an overtone value, and an equalization value,
   store a plurality of contacts in said memory, each contact comprising contact hearing sensitivity data,
   selectively alter voice communications based upon an identity of a calling user, the respective contact hearing sensitivity data in the plurality of contacts for the calling user, and the at least one set of voice communications parameters, the altering of the voice communications being two-sided and including shifting at least part of the voice communications from a first frequency range to a second frequency range based upon a hearing sensitivity characteristic of the user, and
   add false background sounds to the altered voice communications.

2. The mobile wireless communications device according to claim 1 wherein said voice alteration processor downloads the voice alteration code to said memory via said wireless transceiver.

3. The mobile wireless communications device according to claim 1 wherein said voice alteration processor is configured to alter voice communications input to said at least one audio transducer and transmitted via said wireless transceiver.

4. The mobile wireless communications device according to claim 1 wherein said voice alteration processor is configured to alter voice communications output by said at least one audio transducer and received via said wireless transceiver.

5. The mobile wireless communications device according to claim 1 wherein the false background sounds comprise at least one of crowd noise, static noise, fading channel noise, or street noise.

6. The mobile wireless communications device according to claim 1 wherein said voice altering processor is further configured to add music to the altered voice communications.

7. A mobile wireless communications device comprising:
a housing;
a wireless transceiver carried by said housing;
at least one audio transducer carried by said housing;
a memory carried by said housing; and
a voice alteration processor carried by said housing and coupled to said wireless transceiver, said memory, and said at least one audio transducer;
said voice alteration processor cooperating with said memory and being configured to
download voice alteration code and at least one set of voice communications parameters to said memory via said wireless transceiver from a mobile application store platform, each set of voice communications parameters comprising a pitch value, a time constant value, a reverberation value, an overtone value, and an equalization value,
store a plurality of contacts in said memory, each contact comprising contact hearing sensitivity data,
selectively alter voice communications based upon an identity of a calling user, the respective contact hearing sensitivity data in the plurality of contacts for the calling user, and the at least one set of voice communications parameters, the altering of the voice communications being two-sided and comprising changing a plurality of voice communications parameters, the altering of the voice communications including shifting at least part of the voice communications from a first frequency range to a second frequency range based upon a hearing sensitivity characteristic of the user, the voice communications being input to said at least one audio transducer and transmitted via said wireless transceiver,
store unaltered voice communications in said memory during an alteration lag due to the time constant value in the altered voice communications, and
add false background sounds to the altered voice communications.

8. The mobile wireless communications device according to claim 7 wherein said voice altering processor is further configured to add music to the altered voice communications.

9. A method of operating a mobile wireless communications device comprising a housing, a wireless transceiver carried by the housing, at least one audio transducer carried by the housing, a memory carried by the housing, and a voice alteration processor carried by the housing and coupled to the wireless transceiver, the memory, and the at least one audio transducer, the method comprising:
configuring the voice alteration processor to download voice alteration code and at least one set of voice communications parameters from a mobile application store platform, each set of voice communications parameters comprising a pitch value, a time constant value, a reverberation value, an overtone value, and an equalization value;
configuring the voice alteration processor to store a plurality of contacts in the memory, each contact comprising contact hearing sensitivity data;
configuring the voice alteration processor to selectively alter voice communications based upon an identity of a calling user, the respective contact hearing sensitivity data in the plurality of contacts for the calling user, and the at least one set of voice communications parameters, the altering of the voice communications being two-sided and including shifting at least part of the voice communications from a first frequency range to a second frequency range based upon a hearing sensitivity characteristic of the user; and
configuring the voice altering processor to add false background sounds to the altered voice communications.

10. The method according to claim 9 further comprising downloading the voice alteration code via the wireless transceiver.

11. The method according to claim 9 further comprising:
configuring the voice alteration processor to alter voice communications input to the at least one audio transducer and transmitted via the wireless transceiver; and
configuring the voice alteration processor to alter voice communications output by the at least one audio transducer and received via the wireless transceiver.

12. The method according to claim 9 further comprising configuring the voice altering processor to add music to the altered voice communications.

* * * * *